(12) United States Patent
Cintra et al.

(10) Patent No.: US 7,132,135 B2
(45) Date of Patent: *Nov. 7, 2006

(54) METHOD FOR APPLYING ELECTROLYTE IN THE MANUFACTURE OF A BATTERY

(75) Inventors: George Cintra, Holliston, MA (US); Maya Stevanovic, Framingham, MA (US); Ken Taylor, Norfolk, MA (US)

(73) Assignee: The Gillette Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/614,652

(22) Filed: Jul. 7, 2003

(65) Prior Publication Data

US 2004/0068863 A1    Apr. 15, 2004

Related U.S. Application Data

(63) Continuation of application No. 09/568,819, filed on May 10, 2000, now Pat. No. 6,589,612.

(51) Int. Cl.
*B06B 1/20* (2006.01)
*B05D 7/22* (2006.01)

(52) U.S. Cl. ............... 427/600; 427/233; 427/236; 427/115; 29/623.5

(58) Field of Classification Search ........... 427/600, 427/233, 236, 115; 29/623.5; 429/137, 429/131, 126
See application file for complete search history.

(56) References Cited

U.S. PATENT DOCUMENTS

| 4,154,912 A | 5/1979 | Philipp et al. | |
| 4,315,062 A | 2/1982 | Clarizio | |
| 4,888,206 A | 12/1989 | Hope et al. | 427/57 |
| 6,203,941 B1 | 3/2001 | Reichert et al. | 427/137 |
| 6,514,637 B1 | 2/2003 | Treger et al. | |
| 6,589,612 B1 * | 7/2003 | Cintra et al. | 427/600 |

FOREIGN PATENT DOCUMENTS

| EP | 0 886 330 A1 | 12/1998 |
| EP | 898 316 A1 | 2/1999 |
| JP | 55-088266 | * 7/1980 |
| JP | HEI 1-159964 | 6/1989 |
| JP | 05114397 | 5/1993 |
| JP | 08273659 | 10/1996 |
| WO | WO 00/01022 | 1/2000 |

OTHER PUBLICATIONS

Treger, J., et al., "Alkaline Cell With Improved Separator," U.S. Appl. No. 09/280,367 filed Mar. 29, 1999.
Patel, B., et al., "Battery," U.S. Appl. No. 09/358,578 filed Jul. 21, 1999.
"Ultrasonic Atomization," *IVEK—Precision Liquid Metering and Dispensing Systems*, Ivek Corporation, at http://www.ivek.com/utrsoat.html.
"Multispense," *IVEK—Precision Liquid Metering and Dispensing Systems*, Ivek Corporation, at http://www.ivek.com/multisp.html.
"When Precision Counts," *Sono-Tek Ultrasonic Nozzles, Spray . . . Atomizers, Ultrasonic Atomization*, Sono-Tek, at http://www.sono-tek.com/nozzles/nozzles.html, pp. 1-2.

(Continued)

*Primary Examiner*—Katherine Bareford
(74) *Attorney, Agent, or Firm*—Fish & Richardson P.C.

(57) ABSTRACT

Applying materials, e.g. electrolytes and other materials, in the form of a spray during battery manufacture, particularly using a vibratory nebulizer to produce a small droplet, low velocity spray.

7 Claims, 4 Drawing Sheets

OTHER PUBLICATIONS

"Compatability with various liquids," *Compatability*, Sono-Tek, at http://www.sono-tek.com/technology/liquid_tech.html. pp. 1-3.

"Technology Overview," *Ultrasonic Nozzles*, Sono-Tek, at http://www.sono-tek.com/technology/main_tech.html.

"How ultrasonic nozzles work," *How Ultrasonic Nozzles Work*, Sono-Tek, at http://www.sono-tek.com/technology/how_tech.html.

"Ultrasonic Nebulizer," *Misonix-Ultrasonic Nebulizer*, Misonix, at http://www.misonix.com/micro.htm, pp. 1-3.

* cited by examiner

METHOD FOR APPLYING ELECTROLYTE IN THE MANUFACTURE OF A BATTERY

CLAIM OF PRIORITY

This application is a continuation application of and claims priority to U.S. application Ser. No. 09/568,819 (now U.S. Pat. No. 6,589,612), filed on May 10, 2000, the entire contents of which is hereby incorporated by reference.

TECHNICAL FIELD

This invention relates to battery manufacture.

BACKGROUND

Most batteries are constructed using a container, known as a can, that holds reactive chemicals that drive the battery by electrochemical reactions. The chemicals are usually divided by a separator. An electrolyte fluid facilitates ionic flow between the chemicals and across the separator to develop an electric potential.

Generally, alkaline batteries include a cathode, an anode, a separator, and an electrolytic solution. The cathode is typically formed of an active material (e.g., manganese dioxide), carbon particles, and a binder. The anode can be a gel including an active material (e.g., zinc particles). The separator is usually disposed between the cathode and the anode. The electrolytic solution, which is dispersed throughout the battery, can be a hydroxide solution. Alkaline batteries include the conventional AA, AAA, AAAA, C, and D batteries commonly sold in stores. These conventional alkaline batteries include a cylindrical container containing a central, cylindrical zinc gel anode surrounded by a thin separator, which is in turn surrounded by a ring-shaped cathode.

In the manufacture of alkaline batteries it is common to start with a cylindrical can to which is first added a pelletized cathode material that is in the shape of an annulus. A separator is then placed against the surface of the cathode inside the annulus. The separator may be a preformed cylindrical sheet of, e.g., cellulose material, or the separator may be material that is applied as a liquid and then forms a stable film. A small precharge of electrolyte is then added to wet the separator. The precharge is poured into the annular opening defined by the separator and forms a small pool at the bottom of the can from which it wicks into the separator after a period of time. After the pool has been substantially depleted by the wicking action, the anode material, typically a slurry containing, for example, zinc particles, is added to the opening. Allowing time for sufficient wicking is important so that addition of the anode slurry does not displace the pool and cause spillage of electrolyte over the top of the can.

SUMMARY

In an aspect, the invention features a method for applying material in the manufacture of a battery including applying the material in the form of a spray generated from an vibratory nebulizer.

In another aspect, the invention features a method for applying electrolyte in the manufacture of a battery, including applying the electrolyte in the form of a spray.

In another aspect, the invention features a method for applying a separator in the manufacture of a battery, including applying a film-forming system that forms a film. The system includes a first component and a second component. The first and second component are applied simultaneously as a spray.

In another aspect, the invention features a method for applying material in the manufacture of a battery. The method includes selecting a material to be applied and applying the material in the form of a spray having an average droplet size of about 1 micron to about 75 micron less.

Embodiments may also include one or more of the following. The droplet size is about 5 micron to about 30 micron. The spray velocity is about 10 inch/sec or less, preferably about 3 to about 5 inch/sec. The method includes providing a separator and applying the electrolyte to at least one portion of the separator. The method includes providing the separator in a battery can prior to the applying the material by spraying. The method includes applying the electrolyte such that substantial pooling of the electrolyte in the bottom of the can is avoided. The spray is formed by an ultrasonic nebulizer. The material is a film-forming material suitable as a separator. The method includes providing a cathode and applying the film-forming material to at least a portion of the cathode. The method includes providing the cathode in a can prior to applying the film-forming material. The method includes facilitating film-forming by application of a second component, the second component being applied as a spray. The second component is applied sequentially with the film-forming material. For example, the second component may be supplied after application of the first component or the second component may be applied prior to the first component. The second component is applied simultaneously with the film-forming material. The film-forming material is PVA. The PVA is film formed by application of electrolyte. The PVA and electrolyte are applied sequentially. The PVA and electrolyte are applied simultaneously. The battery has a non-cylindrical electrode surface, such as a lobed surface, and the material, e.g. separator material, is applied as a spray originating near the axis of the battery. The battery is an alkaline battery.

Embodiments may provide one or more of the following advantages. Application of materials during battery manufacture by providing the materials in the form of a low velocity, small droplet spray can increase the uniformity of the application, reduce the time required for application, eliminate processing steps, and provide separators and other components with new and advantageous characteristics. For example, spray application of a precharge of electrolyte to a separator provides a highly uniform application of the electrolyte and also eliminates the need to await wicking of electrolyte from a pool of electrolyte that is formed by initially pouring a pre-shot of the electrolyte into the cavity prior to introduction of the anode slurry. Application of film-forming separator material in the form of a spray provides a highly uniform separator that is easily integrated into a manufacturing environment. A vibratory nebulizer, particularly ultrasonic nebulizers, provide substantial advantage in application of materials during battery manufacture. The drop size and velocity-tunable, generally low momentum mist or aerosol generated by such nebulizers allows a low velocity application without generating substantial turbulence or splattering in the tight confines of the battery can environment. Moreover, velocity and drop size can be adjusted. The nebulizer tip diameters are relatively small, making them applicable to the narrow diameter of a variety of battery can sizes.

Still further aspects, features, and advantages follow.

DESCRIPTION OF THE PREFERRED EMBODIMENT

We first briefly describe the drawings.

DRAWINGS

DESCRIPTION

Nebulizer System

Figure 1:
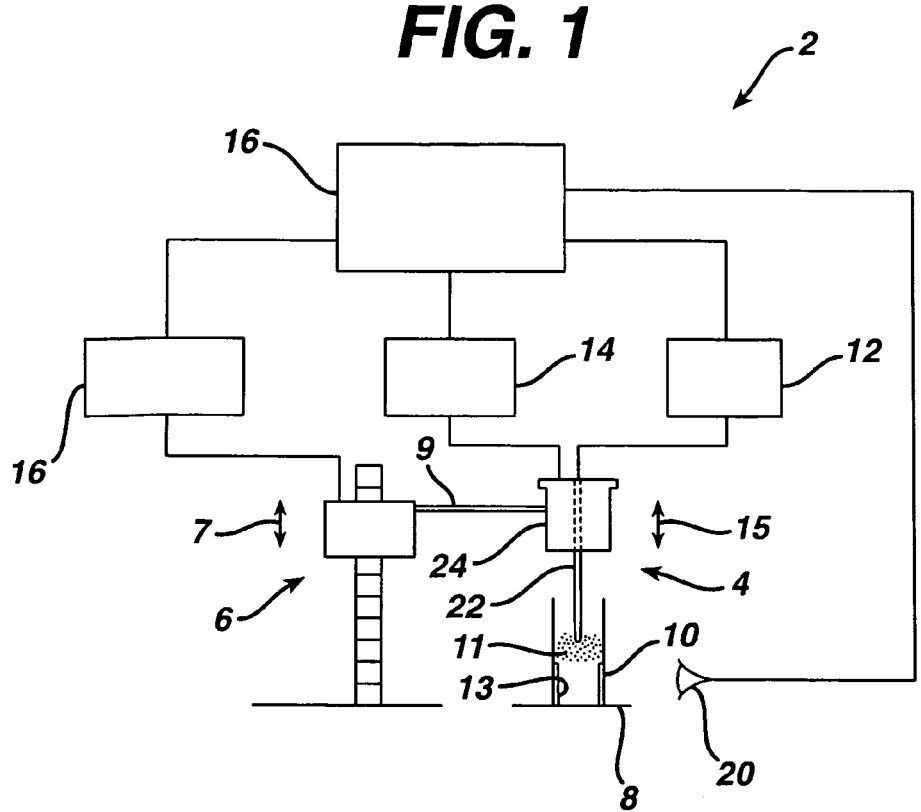
FIG. 1 is a schematic of a system for low velocity, small droplet spray application of materials in battery manufacture.

Referring to FIG. 1, a system 2 for application of material as a spray of low velocity, small droplets during battery manufacture includes a nebulizer 4, including a probe 22, which is assembled by a clamp 9 and on a positioner 6 that permits vertical displacement (arrows 7, 15) of the nebulizer over an assembly line conveyor 8 including battery components such as a battery can 10. The nebulizer is connected to a fluid supply 12 and a power source 14. The vertical positioner has a controller 16. A monitor 20 is provided for monitoring the position of the battery components on the assembly line and/or monitoring the status of the material application from the nebulizer. The overall operation is dictated by a system controller 16. In operation, a desired material, e.g., electrolyte, is provided from the supply 12 to the nebulizer. As a battery can comes to the application station, the nebulizer is lowered such that the nebulizer probe 22 is disposed in the can and nebulization is initiated to form a compact spray 11 for applying an aliquot 13 of material to the internal battery surfaces. The nebulizer can be translated upward (arrow 15) or alternatively, downward, during nebulization, to apply the material to the full extent of the internal surfaces within the can.

Figure 2:
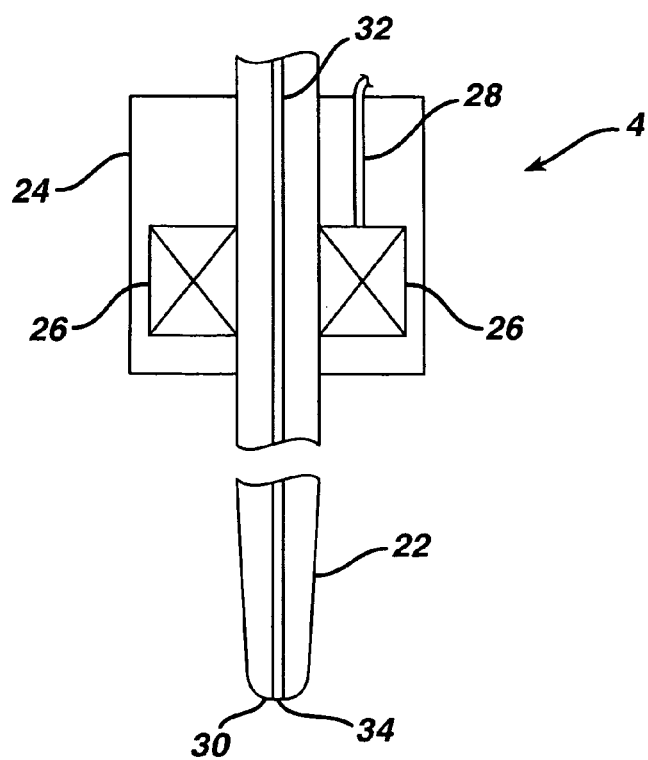
FIG. 2 is a cross-section of an ultrasonic nebulizer.

Referring as well to FIG. 2, the nebulizer may be a vibratory nebulizer, such as an ultrasonic nebulizer. The ultrasonic nebulizer includes a housing 24 and a probe 22. The housing includes piezoelectric elements 26 which are powered by alternating signal via line 28 to impose vibrating motion on the proximal portion of the probe 22. The frequency of the signal is chosen in coordination with the design (particularly length) of the probe to produce vibrating action at the tip 30 of the probe. The probe also includes a liquid feed path 32 along its length. Material to be sprayed is delivered from the supply to the near end of the feed path 32 and expelled from the opening 34 at the tip 30. The vibratory motion of the tip breaks the emerging fluid into a spray.

The velocity and size of the spray in the spray can be controlled by controlling the power and frequency supplied to the nebulizer and the shape of the probe. The droplets are sized small enough so that they uniformly and efficiently coat the surface, such as the surface of a separator which can, for example, yield faster wicking when wetting a separator with electrolyte, but droplets which are too small may be carried by microcurrents away from the surface to which they are being applied. The droplet size can be reduced by increasing the ultrasonic frequency. Preferably, the average droplet size is in the range of about 1 to about 75 micron, more preferably about 5 to about 30 micron, most preferably about 10 to about 25 micron. Droplet size can be measured by laser interferometry.

The velocity of the spray is selected to produce a fine, low energy mist that applies the droplets smoothly without causing them to excessively bounce off the application surface or create turbulence in the confines of the can that can lead to mist formation outside the application area (overspray). The velocity must be high enough to permit the droplets to reach the application surface before gravity or other interactions significantly alter their course. The velocity of the droplets can be controlled by the controlling the power level supplied to the nebulizer. Preferably, the spray velocity is about 10 inch/sec or less, more preferably about 3 to about 5 inches/sec. Spray velocity can be measured by laser interferometry.

The nebulizer probe is typically sized to fit inside the opening within which the material is to be supplied and has a length that permits application into the deepest reaches of the can. The probe diameter is small enough so that the spray forms a stable, low velocity mist, such that a substantial portion of the initial energy imparted to the droplets has been dissipated by the time they reach the application surface. An advantage of the ultrasonic nebulizer is that the spray is projected forward away from the tip of the probe which permits even application to the deepest portions of a can, including the interface between the bottom of the can and the separator. The probe diameter is preferably about 25% or less than the diameter of the opening. The probe can be sized for delivery into openings having diameters between about 2 mm to about 20 mm and depths to about 2 inch common to standard size batteries. For AA size batteries, for example, which have been partially assembled by including cathode pellets and a separator, the central opening has a diameter of about 0.35 inch and a depth of about 1.7 inch. For AAA size batteries, for example, which have been partially assembled by including the cathode pellets and a separator, the central opening typically has a diameter of about 0.23 inch and a depth of about 1.6 inch. Suitable nebulizers, probes, and power supplies are available from Misonix (e.g. Model Micromist 640 system/P80 probe, Misonix, Farmingdale, N.Y.). The Misonix nebulizer has a maximum output power of about 35 watts and operates at a frequency of about 40 KHz. The probe size is 5/16 inch×2¼ inch with a tip diameter of 0.110 inch. The tip has a truncated cone shape and an amplitude of about 70 microns. The droplet size is about 20 microns average and the spray pattern is generally torroidal. The flow rate capacity is about 0.1 to about 30 cc/min. Suitable nebulizers are also available from Sono-Tek (e.g., Model BD type, Sono-Tek, Milton, N.Y.).

Further discussion regarding ultrasound nebulization and characterization of ultrasound sprays is provided in "Ultrasound Liquid Atomization, Theory and Application" by Harvey L. Berger, Partridge Hill publishers (available from Sono-Tek, Milton, N.Y.), the entire contents of which is incorporated by reference.

The fluid supply 12 may be a peristaltic or syringe pump, gear pump, pressurized reservoir or gravity feed. A syringe pump or pressurized reservoir is preferred since these techniques minimize pressure variations during application. For film-forming materials, the plumbing between the supply and nebulizer can be heated with heating tape. Preferred fluid supply systems have a delivery accuracy of about 1 ml±0.2 ml. Suitable systems are available from Ivec, North Springfield, Vt. and HiBar, Toronto, Canada.

The positioner 6 and positioner controller 16 can be a motorized vertical controller or an X-Y digital positioner. The nebulizer positioner and positioning apparatus for the can preferably have an accuracy of about 0.0005 inch. The overall control can be achieved by software and/or hardware. Coating and assembly line monitoring can be achieved by spectroscopic techniques.

Separator Wetting

Figure 3:
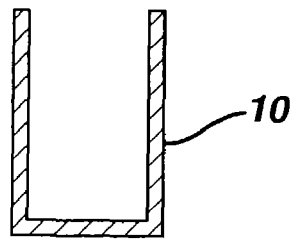
FIGS. 3, 3A, 3B, 3C, 3D and 3E are cross-sectional side views illustrating battery manufacture using application of materials as a spray.
Figure 3A:
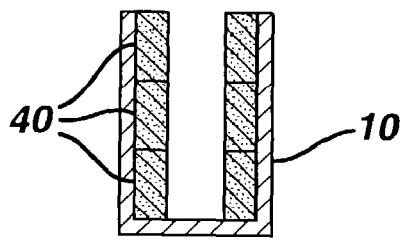
Figure 3B:
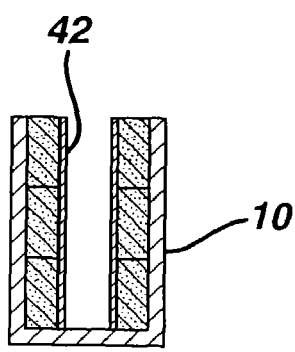
Figure 3C:
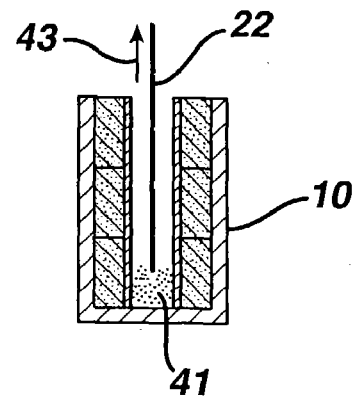
Figure 3D:
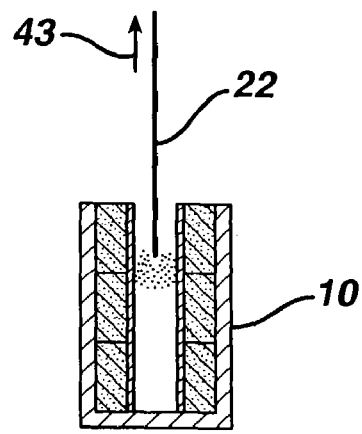
Figure 3E:
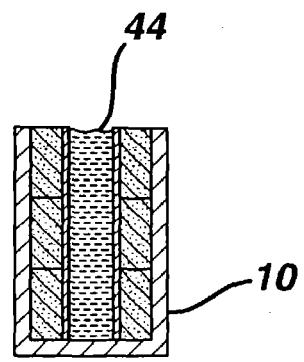

Referring now to FIGS. 3–3E, spray application of a pre-charge of electrolyte for wetting a pre-formed separator is illustrated. Referring particularly to FIGS. 3 and 3A, the can 10 is first provided with a series of annularly shaped cathode pellets 40. Referring to FIG. 3B, a pre-formed cylindrical separator 42 is then inserted into the center opening of the cathode pellets. The separator may be, e.g., a sheet of cellulose material shaped into a cylinder. Referring to FIGS. 3C and 3D, a pre-load of electrolyte is then applied as a spray 41 to wet the separator without forming a substantial pool of electrolyte in the bottom of the can. The preload is applied as a spray by positioning the nebulizer probe 22 in the can and beginning nebulization. The probe is drawn upward (arrow 43) during nebulization. The low velocity, even distribution of electrolyte in the form of small drops quickly wets the separator. In batteries with a positive pip on the bottom of the can, collection of a small pool of electrolyte in the pip dead volume is permissible. As a result, no substantial waiting period is needed before adding the anode slurry. Referring to FIG. 3E, after the probe is removed from the can, the anode slurry 44, including the remaining electrolyte, is immediately dispensed into the can. The battery can then pass to other steps of manufacture such as assembling and crimping the top assembly.

In the application of electrolyte such as 9N KOH solution, the average droplet size is about 10 to about 20 micron, and the power is about 8–12 watts. The probe is lowered to about 0.1 inch from the bottom of the can and drawn vertically at a rate of about 0.5–1.5 inch/sec. The flow rate is about 0.3–1.0 ml/sec. Typically about 20–50% (by weight) of the total electrolyte content of the battery may be applied in the wetting step. In alternative embodiments, the separator may be wetted prior to insertion in the can. Application of electrolyte to the anode or cathode material either prior to or after delivery to the can may also be carried out by spraying.

In further embodiments, the cathode may be wet with electrolyte prior to providing the separator. For example, a can with the cathode pellets may be provided as shown in FIG. 3A. An electrolyte is then applied to the cathode, followed by insertion of a pre-formed separator or application of a film-forming separator, followed by wetting the separator, followed by delivery of the anode material. For example, the cathode may be wet by spray application with about 5–15% by weight, preferably about 10% of the total electrolyte, followed by insertion of a preformed separator which is wet by spray application with about 15–40%, preferably about 20% of the total electrolyte. As a result, substantially 40% or more of the total electrolyte may be applied in the wetting steps by spray application. The total electrolyte for a AA battery, for example, may be about 3.1 g.

Separator Application

Figure 4:
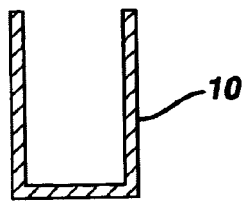
FIGS. 4, 4A, 4B, 4C, 4D, 4E and 4F are cross-sectional side views illustrating another embodiment of battery manufacture.
Figure 4A:
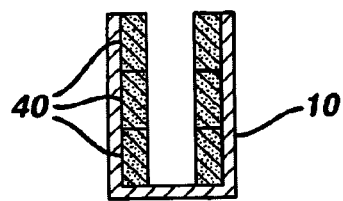
Figure 4B:
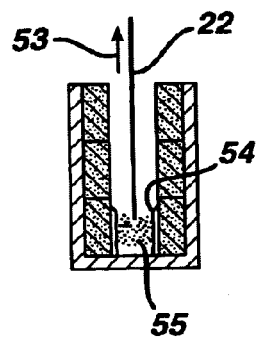
Figure 4C:
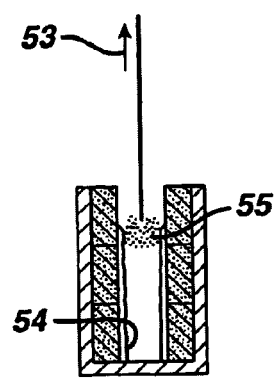
Figure 4D:
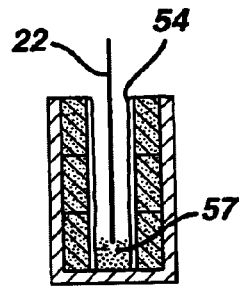
Figure 4E:
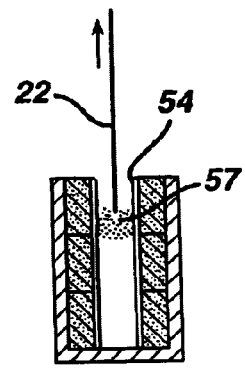
Figure 4F:
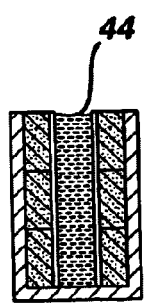

Referring now to FIGS. 4–4F, application of a separator material is illustrated. Referring particularly to FIGS. 4–4A, the can 10 is provided with a series of annularly shaped cathode pellets 40. Referring to FIGS. 4B and 4C, a film-forming solution is then applied as spray 55 into the interior of the pellets by positioning the probe 22 in the can and initiating nebulization. The probe 22 is drawn upward (arrow 53) to apply a coating 54 of the material along the entire interior surface of the cathode. Referring to FIGS. 4D and 4E, the film-forming may be initiated and/or accelerated by application of a second material in a spray 57 from probe 22 in subsequent steps. Referring to FIG. 4F, the anode slurry is provided into the can. The can may then proceed to other steps such as assembly and crimping of the top assembly.

The film-forming material may be, for example, as described in commonly-assigned Treger et al., "Alkaline Cell with Improved Separator", U.S. Ser. No. 09/280,367, filed Mar. 29, 1999, now abandoned, the entire contents of which is incorporated herein by reference. Preferred materials include polyvinyl alcohol (PVA) solutions which form a hydrogel film by viscosity increase that occurs when the solvent evaporates and/or can be thickened by application of a second component that is an acid solution, such as KOH electrolyte, which swells the PVA causing gellation.

In a further embodiment, the electrolyte and film-forming material are sprayed simultaneously. One technique for spraying simultaneously is to premix the PVA and electrolyte at an initial concentration that is stable, i.e. does not induce excessive viscosity increase prior to application. A concentration of about 10% to about 15%, preferably about 7.5% by weight on a dry basis (W/W) PVA in 9N KOH, having a storage life of about 8 h can be used. For most efficient nebulizing, a viscosity of about 70 cps or less is preferred. After application, evaporation of the solvent results in film-forming. A preferred film thickness is about 2 mil thick. Alternatively, the PVA and electrolyte may be mixed immediately prior to nebulization in a Tee positioned just before the nebulizer feed line. In another embodiment, a dual probe nebulizer may be used, with one nebulizer being plumbed to deliver and spray PVA and the other plumbed to deliver and spray electrolyte. In another embodiment a two lumen probe is used, with one lumen supplied with film-forming material and the other with electrolyte. In another embodiment, film-forming material and electrolyte are alternatively delivered to the nebulizer through a flow-switching mechanism.

In other embodiments, the film is formed using cross-linking polymers, including a first component in a polymerization reaction and a second component that induces cross-linking. Alternatively, cross-linking may be induced by application of UV or other radiation or heat. Cross-linking of PVA may be carried out as discussed in U.S. Pat. No. 4,154,912, the entire contents of which is incorporated herein by reference. Polystyrene films may be formed as described in U.S. Pat. No. 4,315,062, the entire contents of which is incorporated by reference. In applications where the film forming is facilitated by heat, vibratory spray application may be used to enhance the film formation. For example, application at high power can generate higher temperatures at the tip which is transferred to the material being applied.

Application to Non-Cylindrical Surfaces

Figure 5:
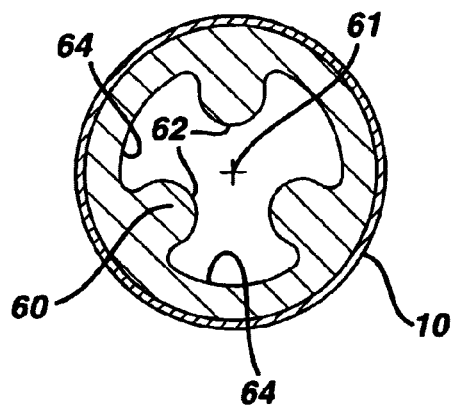
FIGS. 5, 5A and 5B are end-on views illustrating another embodiment of battery manufacture.
Figure 5A:
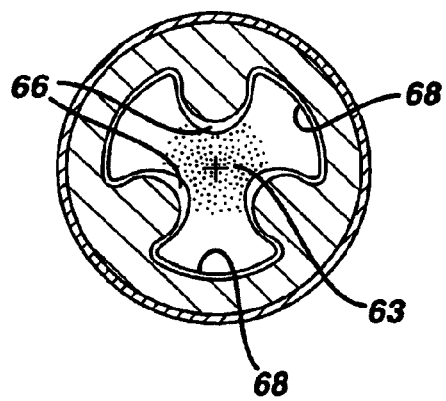
Figure 5B:
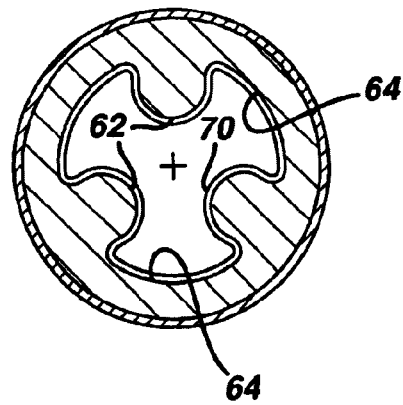

Referring to FIGS. 5–5B, the application of a material, in this example, a film-forming material, to a non-cylindrical battery surface, here a cathode, is illustrated. The cathode may define lobe-shaped cavities as described in commonly-assigned U.S. Pat. No. 6,342,317 by Bhopendra K. Patel et al. and entitled "Battery", the entire contents of which is hereby incorporated by reference. The cathode 60, in a can 10, has an undulating lobe shape including regions 62 that are closer to the battery axis 61 and regions 64 more distantly spaced from the axis.

Referring to FIGS. 5 and 5A, application of a film-forming separator as a spray 63 using a nebulizer probe (not shown) positioned near the axis 61 of the battery can result in deposition in the near regions 62 of more material 66 than in the more distantly spaced regions 64, which receive less material 68.

Referring to FIG. 5B, after nebulization is complete, surface tension and the small surface area and small radius of curvature of the near regions 62 cause the thickness of the material in the near regions 62 to be reduced. As a result, a film is formed in which the film in the near regions is not substantially thinner than in the region 64. Film uniformity and integrity is enhanced. The can may also be rotated about its axis during or after spray application to enhance uniformity by spreading the film by centrifugal force. In further embodiments the probe may be translated off axis into the lobe-shaped cavities during nebulization.

EXAMPLE

The following illustrates ultrasonic nebulizing of PVA separator solutions. The nebulizer was a Sono Tek BD type nozzle with a conical tip and operating at 60 Khz (available from Sono Tek, Milton, N.Y.). The solutions were sprayed inside glass tubes of about 7 mm and about 4 mm. The solution feed line was jacketed to maintain a temperature of about 45 to about 50° C. The probe was heated to about 40° C. by directing flow from a heat gun onto the base. The heat gun flow was terminated during spraying.

Two grades of PVA, in solutions having different viscosities, were tested. One solution had a viscosity of about 35 cps (Gohesnol GL-03, 13% by weight solids, available from Nippon Gohefei, Osaka, Japan, diluted to 13% by weight solids). The other had a viscosity of about 48 cps (Elvanol 51-05, available from Dupont, Wilmington, Del., diluted to about 10% by weight solids). The solutions are prepared as follows. Using a Silverson L4R dispensing rotor/stator mixer, the material was dissolved in deionized water at room temperature for 15 minutes. The solution was heated to 80–90C for 45 minutes and let stand overnight to remove air bubble trapped during mixing. An aliquot (2–3 cc) is used to determine percent of solids by heating at 125° for 10 minutes in a class A recirculating oven. Viscosity can be checked with a Brookfield LV Viscometer (#3 spindle at 60 RPM). For the Elvanol solution, 10 g was dissolved in 90 g of water. For the Gohesnol solution, about 13 g was dissolved in 87 g of water The solutions were sprayed at different flow rates and power. The probe dispense time was about 1.5 sec. The probe was moved vertically at about 0.9–1.1 inch/sec. The results are given in Tables I and II.

TABLE I

Gohesnol GL-03 trial (13% b.w. solids, viscosity - 35 cps)

| Run # | Flow rate (cc/sec) | Power (W) | Comments |
|---|---|---|---|
| B1 | 0.225 | 8 | plume not entirely symmetrical; piezo crystals misaligned? |
| B2 | 0.300 | 8 | plume improves gradually |
| B3 | 0.375 | 8 | plume improves gradually |
| B4 | 0.375 | 12 | good plume, good coverage |
| B5 | 0.500 | 12 | good plume, good coverage |
| B6 | 0.750 | 11 | good plume, good coverage |

TABLE II

Elvanol 51-05 (10% b.w., viscosity 48 cps)

| Run # | Flow rate (cc/sec) | Power (W) | Comments |
|---|---|---|---|
| A1 | 0.500 | 6 | coverage uneven, but continuous |
| A2 | 0.375 | 6 | slightly better coverage |
| A3 | 0.450 | 7 | good coverage |

As the results indicate, even coverage was obtained for both PVA grades. To prevent sagging, the films should be immediately wet with electrolyte and drying should be avoided.

Still further embodiments are in the following claims. For example, spray application can be used in the manufacture of zinc-air batteries to, for example, apply electrolyte or provide a separator.

What is claimed is:

1. A method for applying electrolyte in the manufacture of a battery, comprising applying the electrolyte to a surface in a battery container, the electrolyte being in the form of a spray formed by a vibratory nebulizer, wherein the surface is defined by a separator including a cellulose material.

2. The method of claim 1 wherein an average droplet size of the spray is about 5 micron to about 30 micron.

3. The method of claim 2 wherein the spray velocity is about 3 to about 5 inch/sec.

4. The method of claim 1 comprising
    applying the electrolyte such that substantial pooling of the electrolyte in the bottom of the container is avoided.

5. The method of claim 1 wherein the spray has an average drop size of about 1 micron to about 75 microns.

6. The method of claim 1 wherein the spray has a velocity of about 10 inch/sec or less.

7. The method of claim 1, comprising moving an end of the vibratory nebulizer along a length of the battery container.

* * * * *